United States Patent
Cook et al.

(10) Patent No.: US 6,577,614 B1
(45) Date of Patent: Jun. 10, 2003

(54) SYSTEM AND METHOD FOR OTA OVER CDMA DATA CHANNEL

(75) Inventors: Charles I. Cook, Louisville, CO (US); Michael J. Fargano, Louisville, CO (US); Blake Russo, Denver, CO (US); Thomas P. Doherty, Littleton, CO (US)

(73) Assignee: Qwest Communications International Inc., Denver, CO (US)

(*) Notice: Subject to any disclaimer, the term of this patent is extended or adjusted under 35 U.S.C. 154(b) by 0 days.

(21) Appl. No.: 09/321,056

(22) Filed: May 27, 1999

(51) Int. Cl.[7] ............................. H04Q 7/24; H04L 12/66
(52) U.S. Cl. ...................................... 370/338; 370/352
(58) Field of Search ............................... 370/406, 222, 370/235, 319, 342, 338, 362

(56) References Cited

U.S. PATENT DOCUMENTS

| | | | |
|---|---|---|---|
| 5,546,420 A | | 8/1996 | Seshadri et al. |
| 5,602,838 A | * | 2/1997 | Kartalopoulos ............ 340/2.1 |
| 5,603,081 A | * | 2/1997 | Raith et al. ................ 370/337 |
| 5,729,536 A | | 3/1998 | Doshi et al. |
| 5,751,739 A | | 5/1998 | Seshadri et al. |
| 5,757,846 A | | 5/1998 | Vasudevan |
| 5,805,567 A | | 9/1998 | Ramesh |
| 5,859,843 A | | 1/1999 | Honkasalo et al. |
| 5,867,537 A | | 2/1999 | Dent |
| 5,878,036 A | | 3/1999 | Spartz et al. |
| 5,887,254 A | | 3/1999 | Halonen |
| 5,949,773 A | * | 9/1999 | Bhalla et al. ............... 370/331 |
| 6,034,950 A | * | 3/2000 | Sauer et al. ............ 370/310.2 |
| 6,144,849 A | * | 11/2000 | Nodoushani et al. ....... 370/338 |

* cited by examiner

*Primary Examiner*—Wellington Chin
*Assistant Examiner*—William Schultz
(74) *Attorney, Agent, or Firm*—Brooks & Kushman P.C.

(57) ABSTRACT

A system and method for over the air transmissions over a code division multiple access (CDMA) data channel is provided. A system comprises a data network, a server, and a base station in communication with the data network and configured to receive an update parameter from the server. The base station is further configured to establish a CDMA data channel between the mobile client and the base station, and the base is configured to send the update parameter from the base station to the mobile client over the data channel. The update parameter is sent in accordance with a CDMA air interface standard (such as IS-95) and a CDMA data channel standard for data services (such as IS-707).

4 Claims, 2 Drawing Sheets

SYSTEM AND METHOD FOR OTA OVER CDMA DATA CHANNEL

TECHNICAL FIELD

The present invention relates to a system and method for over-the-air (OTA) transmissions over a Code Division Multiple Access (CDMA) data channel.

BACKGROUND ART

In over-the-air communication systems, at any given time, a plurality of devices share a given bandwidth. That is, each call that is in progress shares the available bandwidth with all other calls that are in progress such that transmissions from one end of the call to the other end of the call are intelligible. For example, in a transmission from a mobile client, such as a cellular phone, to a base station, a plurality of mobile clients may be required to share the given available bandwidth.

One technique for managing multiple calls over a given bandwidth is called Frequency Division Multiple Access (FDMA). In an FDMA system, a discreet amount of frequency bandwidth out of the given available bandwidth is allocated to each user. As such, many calls may take place simultaneously because each call occupies a particular discreet amount of bandwidth. In such a system, a particular discreet amount of frequency bandwidth may be reused in different places throughout the system so long as those different places are sufficiently spaced apart from each other so as to avoid interference.

Another technique for allowing multiple calls to occur over a given bandwidth is called Time Division Multiple Access (TDMA). In a Time Division Multiple Access system, a plurality of calls are allowed to share the same discreet amount of frequency bandwidth, but each call is allowed to use that bandwidth at different times. That is, at any instance in time, only one call is allowed to use a particular frequency, however, many calls are allowed to use that same particular frequency at different times.

In modern communication systems, there is a growing trend towards yet another multiple access technique. This additional technique for allowing multiple transmissions over a given frequency allocation is called Code Division Multiple Access (CDMA). In a Code Division Multiple Access system, a finite allocation of frequency, which may be the entire available frequency bandwidth or other amount of bandwidth as appropriate, is used by each call simultaneously. A transmission in a CDMA system includes a scrambled message and a code. Each call in progress has a unique code such that the receiver can pull the transmission out of the background noise by knowing the code for the call. For example, a plurality of mobile clients may each be assigned a unique code to use when transmitting.

In CDMA systems, which are now becoming quite desirable, existing technologies contemplate over the air activation of the mobile client, such as a cellular phone. Over the air activation is a process of activating services remotely over the air, without requiring a user to take the mobile client or handheld unit to a service center. Over the air provisioning utilizes an over-the-air server connecting to the existing Signaling System 7 (SS7) voice communication network. A base station is connected through a mobile switch center to the SS7 network, and receives service provisioning messages from the OTA server. In particular, it is required that several layers of protocols are layered on top of the service provisioning message, all of which must be removed at the mobile client. The service provisioning messages are generally substantially in accordance with IS-683-A. In existing systems, the protocol interface with the mobile switching center is based on the interim standards IS-41 and IS-725. IS-41 and IS-725 are required to allow proper transmission of the service provisioning message from the OTA server to the mobile client.

Many times, it may be very difficult and costly for a provider to implement a system utilizing IS-41 and IS-725 for over the air activation utilizing the SS7 voice communication network.

DISCLOSURE OF INVENTION

It is, therefore, an object of the present invention to provide a system for over the air transmissions over a code division multiple access (CDMA) data channel utilizing a data channel in accordance with a CDMA air interface standard and further in accordance with a CDMA data channel standard for data services.

In carrying out the above object, a system for over-the-air transmissions over a code division multiple access (CDMA) data channel is provided. The system comprises a data network, a server, and a base station. The server is in communication with the data network, and is configured to send an update parameter. The base station is in communication with the data network, and is configured to receive the update parameter from the server. The base station is further configured to establish a code division multiple access (CDMA) data channel between the mobile client and the base station. The base station is further configured to send the update parameter from the base station to the mobile client over the data channel in accordance with a code division multiple access (CDMA) air interface standard and further in accordance with a code division multiple access (CDMA) data channel standard for data services.

Preferably, the air interface standard is substantially in accordance with IS-95. Further, preferably the data channel standard is substantially in accordance with IS-707. Still further, it is preferred that the update parameter is substantially in accordance with IS-683-A. It is to be appreciated that the use of the data network simplifies implementation of over the air service provisioning messages and reduces cost associated with OTA implementation. A suitable data network is a Transmission Control Protocol/Internet Protocol (TCP/IP) protocol family network.

In preferred embodiments, the mobile client has a memory, and the update parameter is stored in the memory of the mobile client. The memory may may take many forms such as flash memory, and the update parameter may be used for any of the variety of different types of OTA provisioning.

Further, in accordance with the present invention, a method for over the air transmissions over a code division multiple access (CDMA) data channel is provided. The method comprises establishes a code division multiple access (CDMA) data channel between a mobile client and a base station. The base station is in communication with a server over a data network. The mobile client has a memory with a plurality of operating parameters stored therein. The method comprises sending an update parameter from the server to the base station over the data network and sending the update parameter from the base station to the mobile client. The update parameter is sent over the data channel in accordance with a code division multiple access (CDMA) air interface standard and further in accordance with a code division multiple access (CDMA) data channel standard for data services.

Still further, in carrying out the present invention, a method for over the air transmissions over a code division multiple access (CDMA) data channel is provided. The method comprises establishing a code division multiple access (CDMA) data channel between the mobile client and the base station. The method further comprises sending an update parameter substantially in accordance with IS-683-A from the server to the base station over the data network, and sending the update parameter from the base station to the mobile client. The update parameter is sent over the data channel in accordance with a code division multiple access (CDMA) air interface standard and further in accordance with a code division multiple access (CDMA) data channel standard for data serves substantially in accordance IS-707.

The advantages associated with the embodiments of the present invention are numerous. For example, embodiments of the present invention allow over the air service provisioning messages to be sent between the base station and the mobile client or handset. The service provisioning messages include at least one update parameter that may be used to update a variety of different operating parameters stored in the memory of the mobile client. For example, it is to be appreciated that some advantages that may be achieved in accordance with preferred embodiments of the present invention are, but are not limited to, downloading new applications to the mobile client utilizing IS-95 and IS-707, and over the air diagnostics and self tests via the CDMA data channel.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 3 is a schematic diagram illustrating an exemplary technique for layering the various protocols associated with preferred embodiments of the present invention.

BEST MODE FOR CARRYING OUT THE INVENTION

Figure 1:
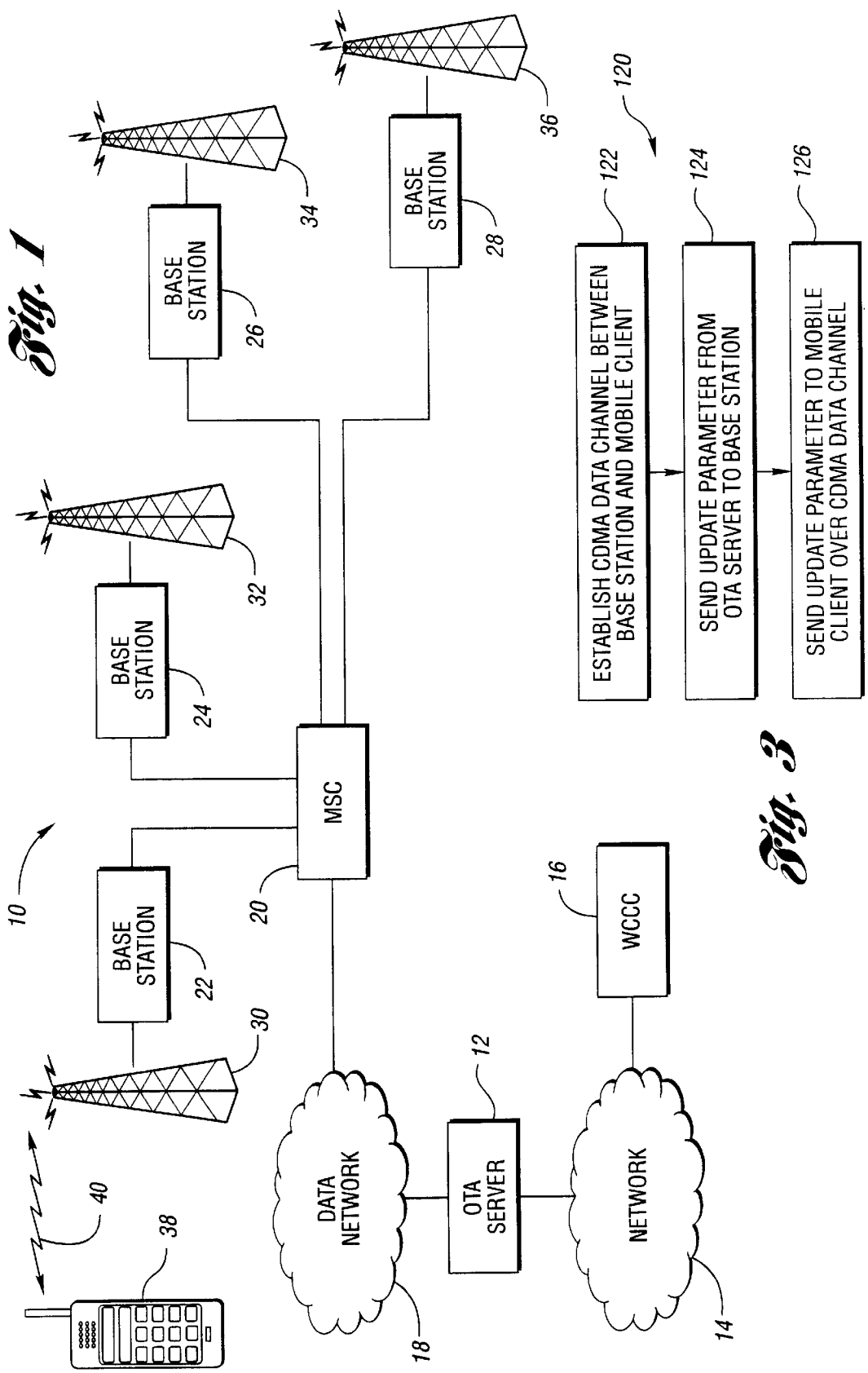
FIG. 1 is a communication system of the present invention utilizing over the air transmissions over a code division multiple access (CDMA) data channel that utilizes a CDMA air interface standard and a CDMA data channel standard for data services to send an update parameter from the base station to the mobile client.

Referring to FIG. 1, a system of the present invention is generally indicated at 10. System 10 is utilized to provide over the air updates, such as authentication, software, and/or service provisioning by sending at least one update parameter over the data network to the mobile client. An over the air (OTA) server 12 is connected by a network 14 to a wireless customer care center 16. OTA server 12 holds all of the update parameters that are eventually sent to the mobile client. OTA server 12 receives update parameters over network 14 from wireless customer care center 16.

For example, a customer may make a voice call to wireless customer care center 16, to request service provisioning or any other type of update that will later be received over the air as described herein. In turn, a service technician at the wireless customer care center 16 sends appropriate update parameters over network 14 to OTA server 12. Of course, it is appreciated by those skilled in the art that the update parameters are not limited to any particular sort of service provisioning or software, and that information at OTA server 12 may originate from other sources besides wireless customer care center 16.

OTA server 12 is connected to a data network 18. In accordance with embodiments of the present invention, it is to be appreciated that network 18 is a data network, such as a data network utilizing the Transmission Control Protocol/Internet Protocol (TCP/IP) protocol family for communication. That is, data network 18 is a true data network as opposed to the existing Signaling System 7 (SS7) voice network.

Data network 18 extends over a geographic region and connects to a number of mobile switch centers 20. It is to be appreciated that only a single mobile switch center 20 is shown for convenience, and that a wireless application may employ any number of mobile switch centers 20 connected to data network 18. Further, if desired, different OTA servers may be used for different geographic regions, or a single OTA server may be provided to service all of the mobile switch centers 20. Each mobile switch center 20 has at least one base station connected thereto. As shown, first base station 22, second base station 24, third base station 26, and fourth base station 28 are each connected to mobile switch center 20. Each base station 22, 24, 26, and 28, is connected to a corresponding transceiver 30, 32, 34, and 36, respectively.

Each transceiver 30, 32, 34, and 36 is configured for code division multiple access (CDMA) services. CDMA services have a number of advantages over other types of bandwidth provisioning techniques as it is appreciated by one of ordinary skill in the art such as, for example, soft hand-off of a call when a mobile client passes out of the range of a particular transceiver and into the range of another transceiver.

The mobile client, indicated at 38, may have a number different telephony functions such as voice capability, data capability, including hand-held Internet browsing capability and other functionality as appreciated by one ordinary skill in the CDMA telecommunications art. As shown, mobile client 38 and transceiver 30 are configured for over the air parameter updating, as indicated by communication 40.

In accordance with the present invention, communication 40 includes the transmission of at least one update parameter from base station 22 (via transceiver 30) to mobile client 38 over an established data channel therebetween, and in accordance with a code division multiple access (CDMA) air interface standard and further in accordance with a code division multiple access (CDMA) data channel standard for data service.

In a preferred embodiment of the present invention, the air interface standard is substantially in accordance with IS-95. Further, the data channel standard is preferably substantially in accordance with IS-707. Still further, preferably, the update parameter is substantially in accordance with IS-683-A. The particular techniques utilized in layering the various protocols so that the update parameter may be successfully transmitted from OTA server 12 to mobile client 38, in a preferred embodiment, is best shown in FIG. 2.

In an exemplary implementation, a customer may make a voice call to wireless customer care center 16 with mobile client 38. During the voice call, the customer and service technician may determine an appropriate update for the mobile client. After the voice call has ended, and a predetermined amount of time sufficient to allow the service technician to update the parameters at OTA server 12 has passed, the customer may make a data call with mobile client 38 to connect with OTA server 12 and receive the update parameter. Of course, it is to be appreciated that the update parameters may reach OTA server 12 in a variety of ways, and that embodiments of the present invention are particularly suited for transmitting the update parameters from OTA server 12 to mobile client 38 over a CDMA data channel, preferably, in substantial accordance with IS-95 and IS-707. Suitable update parameters are in accordance with IS-683-A.

Figure 2:
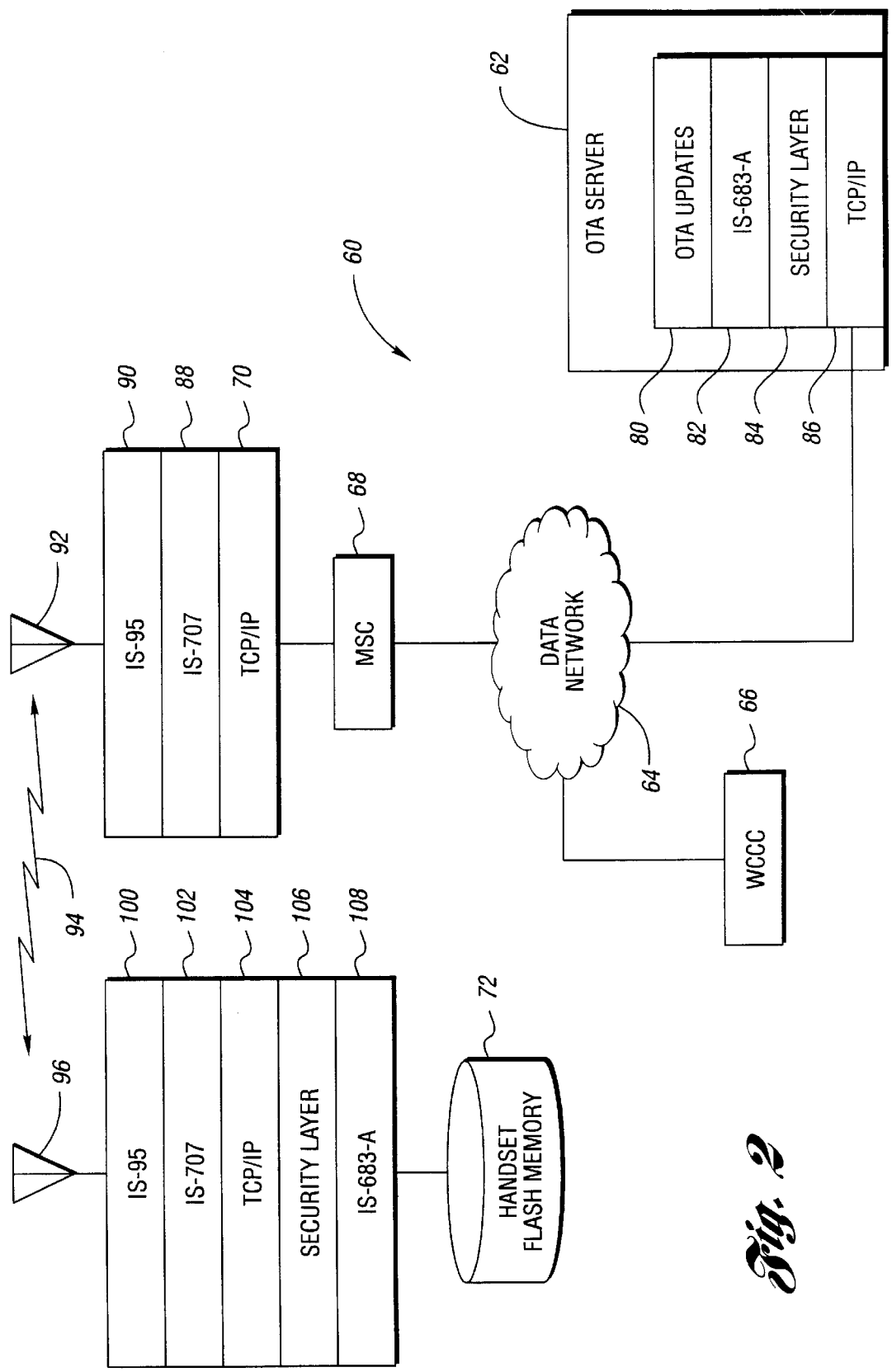
FIG. 2 is a block diagram illustrating a method of the present invention.

As best shown in FIG. 2, a system of the present invention is generally indicated at 60. System 60 includes OTA server 62 which is connected to network 64. A wireless customer care center 66 is also shown connected to network 64. As shown, network 64 is a data network because embodiments of the present invention connect OTA server 62 to the mobile client over a data network such that parameter updates maybe made over a CDMA data channel between the mobile client and the base station. A mobile switch center 68 is connected to network 64 and also connects to a base station 70. The mobile client has a memory 72 for receiving the update parameter. In preferred embodiments, the memory is of the flash type and contains a number of different parameters of which a selected set or all may be updated over the air through the CDMA data channel in accordance with the present invention.

As mentioned previously, OTA updates 80 which include at least one update parameter, are sent from OTA server 62 to the handset flash memory 72 in a manner that involves a number of protocol layers, of which a preferred technique is illustrated in FIG. 2. In particular, a suitable protocol for the update parameters is IS-683-A as indicated at reference numeral 82. Although IS-683-A is a protocol for over the air service provisioning of mobile stations in wideband spread spectrum systems, such as code division multiple access (CDMA) systems, it is to be appreciated by those of ordinary skill in the art that other protocols may be appropriate for update parameters. Although embodiments of the present invention are particularly employed to transmit the update parameter from the base station to the mobile client, it to be appreciated that certain layering techniques are preferred between OTA server 62 and base station 70. Preferably, a security layer 84 is added on to the IS-683-A layer 82. Thereafter, one or more data network protocols are added to the security layer 84 so that transmissions may be sent over data network 64. As mentioned previously, appropriate data network protocols maybe selected from the Transmission Control Protocol/Internet Protocol (TCP/IP) protocol family, as is indicated at reference numeral 86.

The OTA updates are then routed over data network 64 to mobile switch center 68, and then to base station 70. Of course, it is to be appreciated by those skilled in the art that various layers may be added and/or removed from OTA updates 80 between OTA server 62 and base station 70 depending on the particular application for embodiments of the present invention.

In accordance with present invention, at base station 70, a code division multiple access (CDMA) data channel standard for data services layer is added as indicated at 88. Further, a code division multiple access (CDMA) air interface standard layer is also added at base station 70. Suitable data channel and air interface layers are IS-707 and IS-95, respectively. After the air interface standard layer is added, base station transceiver 92 transmits (arrow 94) to mobile client transceiver 96. At the mobile client, a number of layers are then removed to reveal the original OTA updates 80 from OTA server 62 so that the update parameter or parameters may be placed in the handset flash memory 72.

In particular, the mobile client first removes the air interface standard and data channel layers (IS-95 and IS-707) as indicated at 100 and 102, respectively. Thereafter, the data network layer or layers (such as appropriate TCP/IP family layers) are removed as indicated at 104. Thereafter, in preferred embodiments, the security layers removed as indicated at 106. At this point, the OTA updates 80 are in the established form which may be in accordance with IS-683-A as indicated at block 108. Then, the update parameter may be placed in the handset flash memory 72.

It is to be appreciate that the embodiments of the present invention are appropriate for utilizing a data network to send parameter updates from an OTA server to the mobile client. Suitable protocols, such as IS-707 and IS-95 provide the appropriate layering for sending these update parameters over the data network, from the base station to the mobile client, and into the handset memory. The embodiments of the present invention have a number of features, best illustrated in FIGS. 1 and 2, including but not limited to IS-683-A riding over a circuit switched or a packet switched data channel, and downloading information to the mobile clients over IS-95 and IS-707. As the amount of handset memory permits, embodiments of the present invention may include the downloading of operating systems, new applications, Global Positioning System (GPS) location data, 2-way service management system (SMS), a microbrowser, diagnostics, key provisioning, authentication, pre-service testing, and/or handset self-test.

With reference to FIG. 3, a preferred method of the present invention is generally indicated at 120. At block 122, a code division multiple access (CDMA) data channel is established between a mobile client and a base station. The base station is in communication with a server over a data network. The mobile client preferably has a memory with a plurality of operating parameters stored therein. At block 124, an update parameter is sent from the server (OTA server) to the base station over the data network. At block 126, the update parameter is sent to the mobile client over the established CDMA data channel. The update parameter is sent over the data channel in accordance with a code division multiple access (CDMA) air interface standard (for example, IS-95) and further in accordance with a code division multiple access (CDMA) data channel standard for data services (for example, IS-707).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for over the air transmissions over a code division multiple access (CDMA) data channel, the system comprising:
    a data network;
    a server in communication with the data network and configured to send an update parameter; and
    a base station in communication with the data network and configured to receive the update parameter from the server, the base station being further configured to establish a code division multiple access (CDMA) data channel between the mobile client and the base station, the base station being further configured to send the update parameter from the base station to the mobile client over the data channel in accordance with a code division multiple access (CDMA) air interface standard and further in accordance with a code division multiple access (CDMA) data channel standard for data services wherein the data network is a Transmission Control Protocol/Internet Protocol (TCP/IP) protocol family network.

2. The system of claim 1 wherein the mobile client has a memory and is configured to store the update parameter in the memory of the mobile client.

3. A method for over the air transmissions over a code division multiple access (CDMA) data channel, the method comprising:

establishing a code division multiple access (CDMA) data channel between a mobile client and a base station, the base station being in communication with a server over a data network, and the mobile client having a memory with a plurality of operating parameters stored therein;

sending an update parameter from the server to the base station over the data network; and sending the update parameter from the base station to the mobile client, the update parameter being sent over the data channel iii accordance with a code division multiple access (CDMA) air interface standard and further in accordance with a code division multiple access (CDMA) data channel standard for data services wherein the data network is a Transmission Control Protocol/Internet Protocol (TCP/IP) protocol family network.

4. The method of claim 3, wherein the mobile client has a memory, and the method further comprises:

storing the update parameter in the memory of the mobile client.

* * * * *